Figure 4:
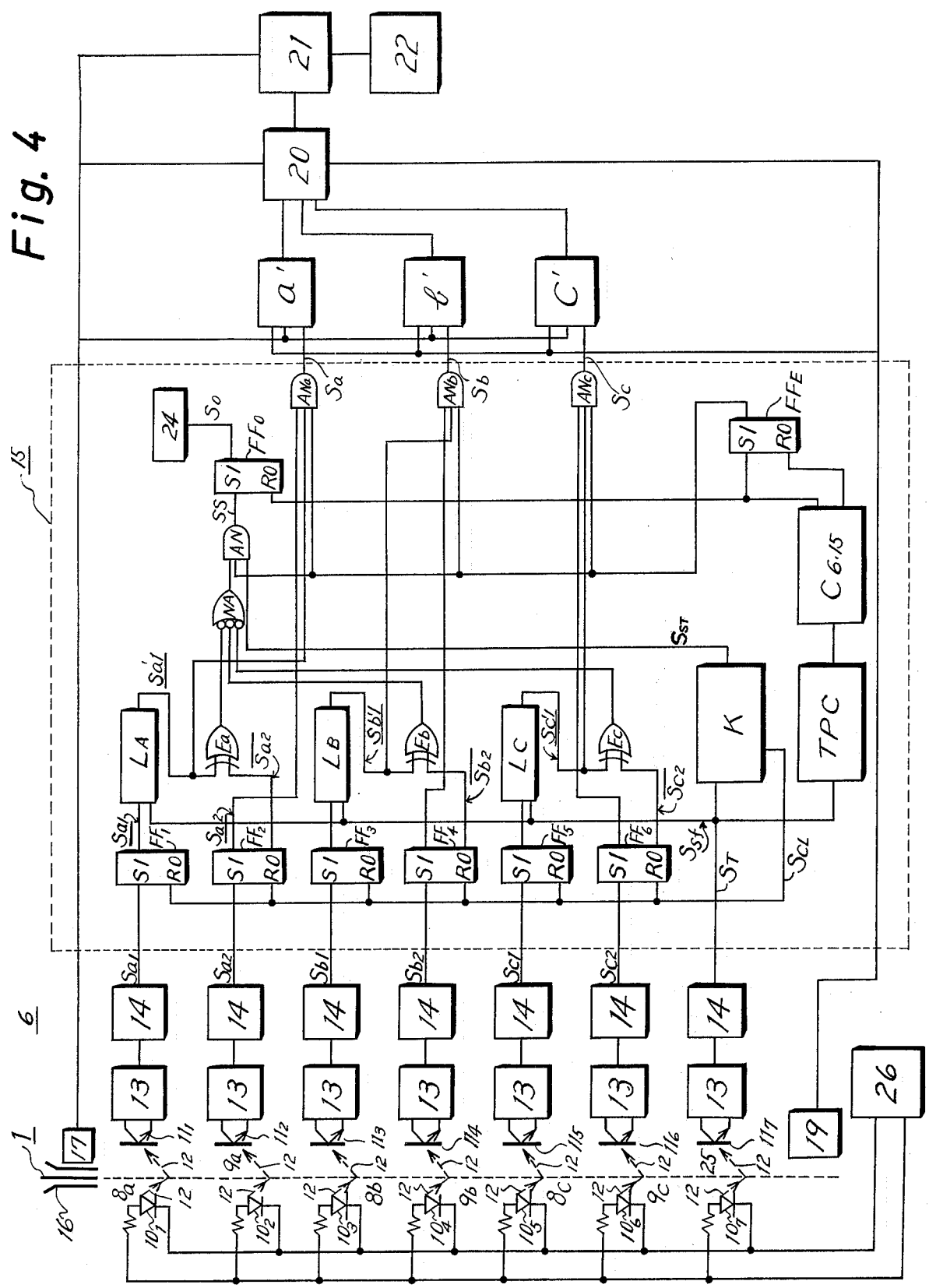

United States Patent [19]

Saito

[11] 3,986,001

[45] Oct. 12, 1976

[54] SALES COMPUTER UTILIZING SENSOR PAIRS

[75] Inventor: Yutaka Saito, Kyoto, Japan

[73] Assignee: Toaseiko Co., Ltd., Kyoto, Japan

[22] Filed: Aug. 8, 1975

[21] Appl. No.: 603,025

Related U.S. Application Data

[63] Continuation-in-part of Ser. No. 392,087, Aug. 23, 1973, abandoned.

[52] U.S. Cl. ............... 235/61.11 E; 235/61.12 N; 235/61.6 E; 250/568; 35/48 B; 340/146.3 J
[51] Int. Cl.² ............... G06K 7/14; G09B 7/02; G06K 19/06
[58] Field of Search ............ 235/61.11 R, 61.11 E, 235/61.11 D, 61.12 N, 61.12 M, 61.6 R, 61.6 A, 61.6 E, 61.7 R, 61.12 R, 61.9 R; 250/566, 568, 569; 35/48 B, 42; 164/115; 101/19; 360/2; 340/146.3 Z, 146.3 J

[56] References Cited
UNITED STATES PATENTS

| | | | |
|---|---|---|---|
| 3,487,560 | 1/1970 | Hassfurther | 235/61.6 E |
| 3,527,927 | 9/1970 | Bijleveld | 235/61.11 E |
| 3,710,319 | 1/1973 | Miller | 340/146.3 J |
| 3,845,280 | 10/1974 | Dillon | 235/61.11 R |

*Primary Examiner*—Daryl W. Cook
*Assistant Examiner*—Robert M. Kilgore
*Attorney, Agent, or Firm*—Kurt Kelman

[57] ABSTRACT

One pair of sensing elements is furnished for each column of a card being transported past the sensing element in the direction of the columns. The first and second sensing element constituting each pair are spaced apart from each other both in a direction perpendicular to the columns and in a direction along the columns. The marking signals generated by each sensor element in response to the same mark are therefore separated in time from each other and a delay circuit is furnished for delaying the first furnished marking signal until receipt of the second. Electric circuits are provided which furnish the signals for further processing to the computer only in the simultaneous presence of both of these signals. Further, a miscount indication is provided by additional logic circuits if one of the signals is missing while the other is present.

8 Claims, 12 Drawing Figures

Direction of the
Card Advancing

SALES COMPUTER UTILIZING SENSOR PAIRS

This is a continuation-in-part of my copending application Ser. No. 392,087, filed Aug. 23, 1973, now abandoned.

This invention relates to a sales check-out computing system wherein cards are processed, each having a plurality of columns, each column being associated with a corresponding unit price. For each purchaser, the clerk will make marks in a column signifying the total number of articles bought at the unit price indicated at the head of said column. Such cards can be utilized as receipts and, further, are processed at the check-out counter by being inserted into a card reading computer which senses the marks and calculates the sum of the prices of all articles and furnishing an indication of the so-calculated totaled price. Such a card processing computer therefore eliminates the inconveniences involved in the conventional register systems. In these later systems the customer must wait for the time during which the register attendant will check out all the purchased items and then compute the total price of the purchase on said register.

Figure 5:
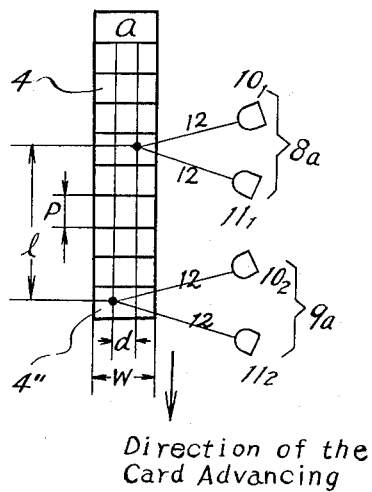
Figure 6:
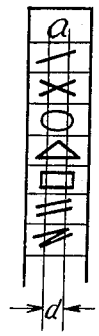
Figure 8:
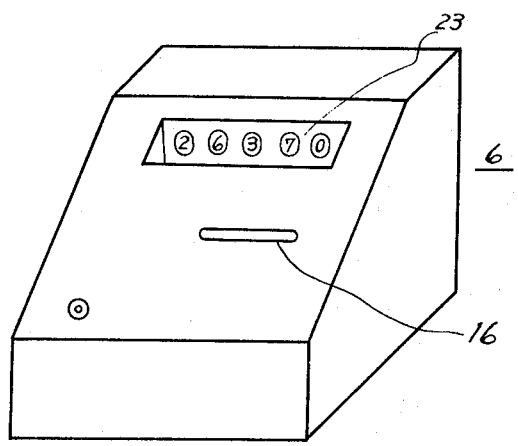
Figure 7:
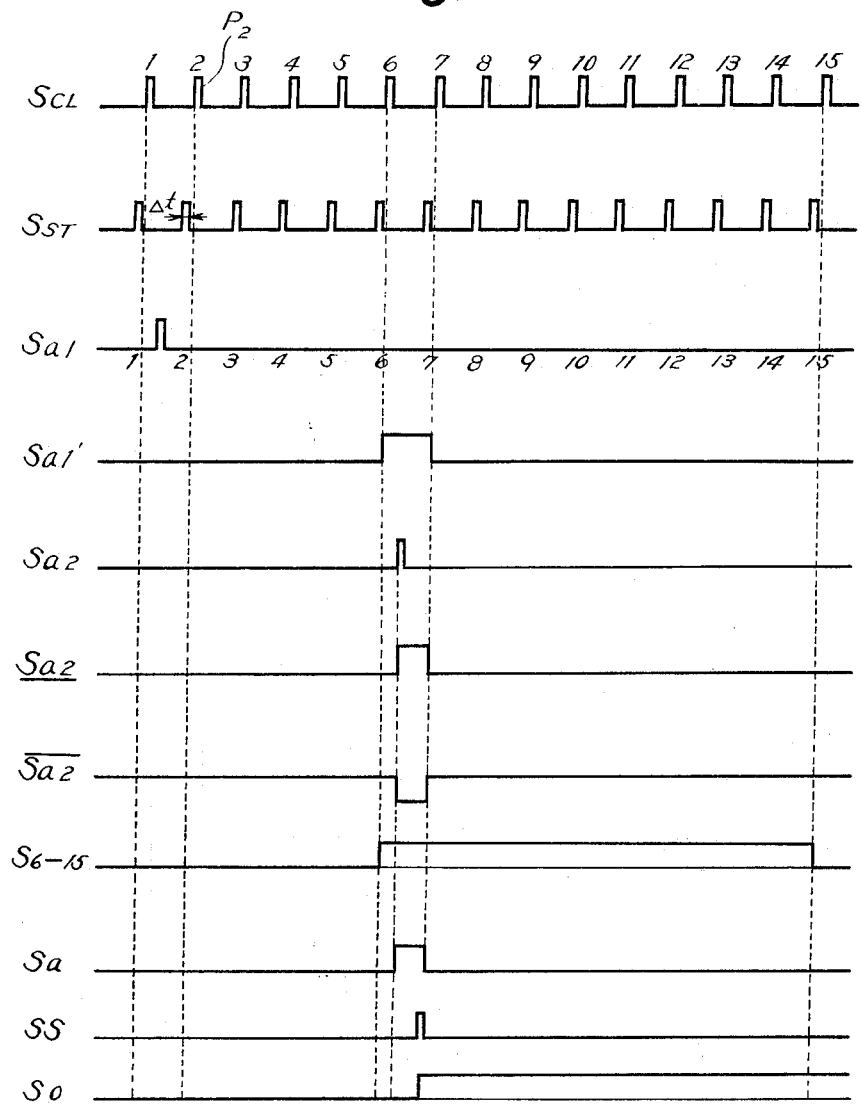
Figure 9:
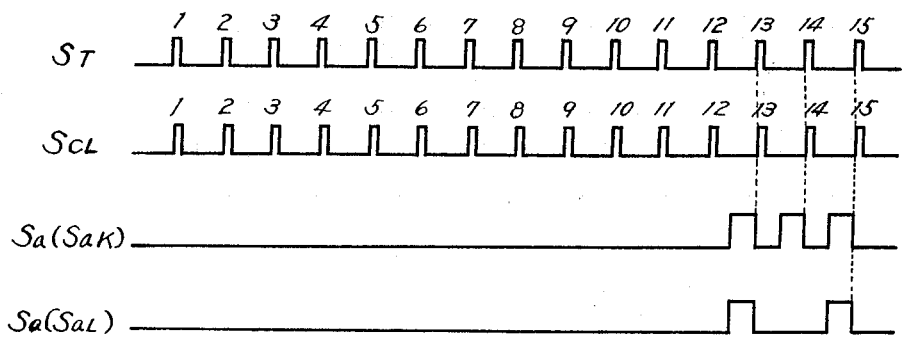

The invention will now be explained further in detail with reference to the drawings, in which:

FIG. 1 is a front view of a card used for the sales account computer according to this invention;

FIGS. 2 (a) and (b), and FIGS. 3 (a), (b) and (c) are illustrations of cards, on which various style of markings are included;

FIG. 4 is a schematic block diagram showing the computer according to this invention, FIG. 5 is an illustrative diagram showing a pair of sensors reading out a mark on a card, FIG. 6 shows several example of possible marks to entered in the columns of a card, FIGS. 7 and 9 are illustrative wave form diagrams of signals at principal locations in the diagram of FIG. 4, and FIG. 8 is a perspective view of the sales account computer according to this invention.

In FIG. 1, wherein an example of the sales accounting bill 1 (simply referred to as a card, hereinafter) usable in the system of this invention is shown. The card 1 is seen to have an upper row listing unit prices $a$, $b$, $c$ yen ..., below which is seen a plurality of blank sections or spaces 4 formed by horizontal and vertical divisional lines 2, 3. Marks 5 are to be entered into the above said spaces successively, starting at the top of each column and continuing downward, one for each article sold to a customer. The divisional lines 2, 3 in the card 1 are preferably to be printed with red ink or the like, and the marks 5 filled into the sections 4 may preferably be black, for example, drawn by a pencil or any color other than red or the like. The marks on card 1 as depicted in FIG. 1 signify that three pieces of the goods of $a$-yen unit price, one piece of $b$-yen and two pieces of $c$-yen have been sold. If the card as shown is inserted into the computer 6 through the receiver slit thereof, of which block diagram is illustrated in FIG. 4, then the mark reading out sensor incorporated in the computer (it may be of the combination of a luminous diode and a photo-transistor) will read out the marks in a preferred embodiment, a light emitted from the luminous diode illuminates the marked sections of the card. The reflected light by the card is read out by a detector as, for example, a photo-transistor, which furnishes a corresponding marking signal. A sub-total for each unit price of the article is computed by counting the marks in each column and multiplying by the corresponding unit price. Then the total price is calculated and, if necessary, printed on the card. Now, if any section or space 4 is filled with perfect marks as shown in FIG. 2(a), they may adequately be read out, but if one or more sections are filled with imperfect marks, as may be seen in FIG. 2(b), and these are scanned by only one sensor for each price column $a$, $b$ and $c$, then some mark may fail to be read out due to improper positioning thereof relative to the sensor, resulting in an incorrect number of marks being read out. For example, referring to FIG. 2(a), the sensor S for the unit price column $a$ may adequately read out three marks, but, referring to FIG. 2(b), the imperfect mark 5' in the section 4' may not be read out by the sensor S when scanning the column $a$ similarly as above, so that only two marks may be read out, i.e. two, rather than three marking signals are furnished by sensor S when scanning column $a$ of FIG. 2(b). Accordingly, if the mark has been inadequately entered in a certain section, the sensor may fail to read out it, and further, if any blank section within the column has a dust spot or a smear within the column by the sensor, there would be an error created in that the sensor would read out said dust spot or smear as one unit price.

For the purpose of relieving the defects stated above, according to this invention it is proposed to provide, for each column, $a$, $b$ and $c$, a pair of sensors $8a$, $9a$; $8b$, $9b$; and $8c$, $9c$ respectively, said sensors 8, 9 being spaced apart by $d$ in horizontal direction, and by $l$ in vertical direction or in the direction the card is transported (see FIG. 3).

A logic circuit is provided to operate that it may have an output of a marking signal only when both sensors have read out the mark in a section, but when either or neither of sensors has read out the mark, no marking signal is produced, the logic circuit being shown further in detail hereinafter.

According to the feature stated above, any misreading and misoperation therefrom may be precluded to highly improve the reliability of the device. If necessary the number of sensors for each column could be further increased for improving the reliability. In practice a sufficient reliability has been assured by providing two sets of sensors 8 and 9 for each column of unit price (sensors $8a$ and $9a$ for column $a$, $8b$, $9b$ for column $b$, and $8c$, $9c$ for column $c$).

The function of the calculator according to this invention will now be explained with respect to cards for various cases. In FIG. 5 may be seen means to read out the marks included in the column $a$ of the unit price as a simple case (Reading out may be similarly done for columns other than $a$ of unit price). A pair of mark sensors $8a$ and $9a$ are disposed in operative proximity to the $a$ column of unit price on the card, and, respectively, consist of luminous elements (red light emitting diodes) $10_1$ and $10_2$, and of phototransistors $11_1$ and $11_2$. It will be understood that pairs of mark sensors $8b$, $9b$; $8c$, $9c$ ... are similarly provided for any columns for unit prices other than $a$. The calculator is provided with as many sets of sensors 8 and 9 as the number of unit prices, and they are connected to the power source 26 (FIG. 4). In the example shown, the number of unit prices is 3, $a$-yen, $b$-yen and $c$-yen.

The 15 horizontal lines 1, 2 ... 15 printed on the left side of the card and generally designated as 7 in FIG. 1 are timing marks. As shown in FIG. 3, a pair of sensors is disposed (instead of being confined within an area corresponding to one section of the card) a distance $d$ apart horizontally and a distance $l$ apart vertically ($l$ is an integral multiple — 5 times — of vertical side length $p$ of a section, $p$ being one bit).

As may be seen in FIG. 4, which is a block diagram of the computer, respective pairs of sensors ($8a$, $9a$), ($8b$, $9b$) and ($8c$, $9c$) for the unit price columns $a$, $b$ and $c$ consist of a luminous diode $10_1$ and a photo-transistor $11_1$; and similarly, ($10_2$, $11_2$); ($10_3$, $11_3$); ($10_4$, $11_4$); ($10_5$, $11_5$); and ($10_6$, $11_6$), respectively. The sensor 25 for reading out the timing mark consists of a luminous diode $10_7$ and a photo-transistor $11_7$.

Now, if a card $l$ having marks filled therein be inserted into the receiver slit 16 of the computer 6, a limit switch 17 will be operated to reset the counters $a'$, $b'$ and $c'$ provided respectively for the unit price column $a$, $b$, and $c$, the sub-total circuit 20 and the adder circuit 21, thereby to open the gate of the counter. The card having been inserted into the slit 16 is now advancing within the counter. Thus the light 12, 12 emitted from the luminous diodes of the two sensors $8a$ and $9a$ will be incident upon the photo-transistor $11_1$ and $11_2$, respectively. The marks within the sections 4 will thus be read out by the detector or the photo-transistors $11_1$ and $11_2$.

The pulses furnished by phototransistors $11_1$ and $11_2$ will be shaped into corresponding first and second marking signals by amplifiers 13 and wave shaping circuits 14.

Logic circuit 15, as stated above, furnishes an output signal, herein referred to as a final marking signal, only when any set or pair of sensors, has read out the same mark. Each of these final marking signals is applied as an input to the corresponding one of counters $a'$, $b'$ and $c'$ corresponding to the unit price columns $a$, $b$, and $c$ respectively. For example, with respect to a card as shown in FIG. 3$a$, the marks 5 in the unit price columns $a$, $b$, and $c$ represent, respectively, three pieces or units, one piece, and two pieces at unit price $a$, $b$, and $c$ respectively. These are read out by sensors ($8a$, $9a$) ($8b$, $9b$) and ($8c$, $9c$), so that logic circuit 15 furnishes respective final marking signals to the inputs of counters $a'$, $b'$, and $c'$.

Figures 3A, 3B, 3C:
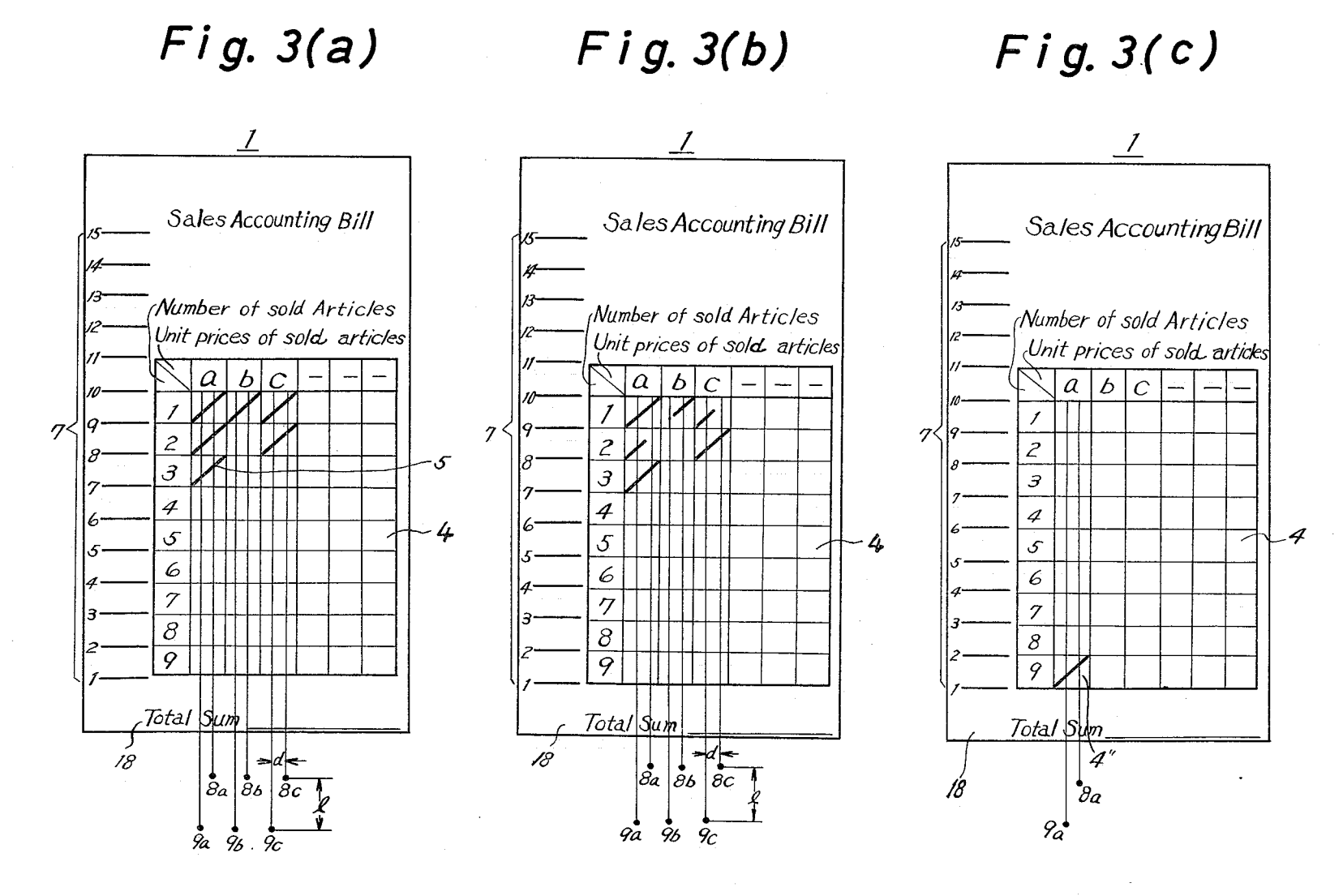

On the other hand, if a card having incomplete marks as shown in FIG. 3(b) is introduced into the counter slit, the sensor $9a$ will read out three marks for the price $a$ column but the sensor $8a$ will read out only two marks; for the price $b$ column the sensor $8b$ will read out one mark but the sensor $9b$ will read out no mark, and for the price $c$ column the sensor $9c$ will read out two marks but the sensor $8c$ will read out one mark. Accordingly, the logic circuit 15 will produce a set of signals which, if applied to counters $a'$, $b'$ and $c'$ will result in too low a count. Such an inconsistency will immediately actuate a miscount indicator circuit (explained further in detail hereinafter) in logic circuit 15 to issue a warning signal to urge the attendant to check the card in question.

Now the operation of the circuit as shown in FIG. 4 will be explained. It will first be assumed for the sake of simplicity that a mark is filled only in the section 4″ at the bottom of the column for unit pieces $a$, said section corresponding to nine pieces of articles having been sold, said mark being adapted to be read out by the sensors $8a$ and $9a$ belonging to the price $a$ column.

The area 15 enclosed by dashed lines in FIG. 4 is the logic circuit, wherein $FF_1$, $FF_2$, $FF_3$, $FF_4$, $FF_5$, $FF_6$, $FF_D$, and $FF_E$ show flip-flop circuits, respectively, $L_A$, $L_B$ and $L_C$ shift registers of five bits, $E_a$, $E_b$ and $E_c$ exclusive OR-circuits, K a clock pulse and strobe-pulse generator circuit for resetting purposes, TPC a timing pulse counter, $C_{6.15}$ a decoder (part of gating means) being adapted to produce an output signal at times when the sixth and fifteenth timing pulse are received from the timing pulse counter TPC out of a sequence of pulses continuously received therefrom, a NAND circuit NA, and ANa, ANb, ANc, and AN designating AND circuits. Sets of sensors ($8a$, $9a$), ($8b$, $9b$) and ($8c$, $9c$) are adapted to read out respective marks filled in sections in the unit price columns $a$, $b$ and $c$, and marking signals Sa1, Sa2, Sb1, Sb2, Sc1, Sc2 furnished by wave form trimming circuit 14 are applied to the set inputs of the flip-flops FF1, FF2, ... FF5, and FF6, respectively. The flip-flops are adapted to be reset by a clock pulse immediately following the said marking signal. This clock pulse is one of a sequence of clock pulses ScL furnished by clock-pulse and strobe-pulse generator circuit K (the second pulse $P_2$ in the series of clock pulses ScL as shown in the wave form diagram of FIG. 7) (Signal Sa1 being considered for example). The respective read out signals Sa1, Sb1 and Sc1 from respective sensors $8a$, $8b$ and $8c$ associated with respective columns of unit prices $a$, $b$ and $c$ are caused by means of shift registers $L_A$, $L_B$ and $L_C$, respectively, to be delayed by five bits in time. These signals are herein referred to as delayed first marking signals and are designated by Sa′1, Sb′1 and Sc′1 in FIG. 4. On the other hand, as the sensors $9a$, $9b$ and $9c$ associated with unit price columns $a$, $b$ and $c$, respectively, are situated in positions retarded by five bits as seen in the direction of the card advancement from the first sensors $8a$, $8b$ and $8c$, and are shifted transversely therefrom, the marking signals Sa2, Sb2 and Sc2 furnished by the sensors $9a$, $9b$ and $9c$, respectively, appear in synchronism with the delayed first marking signals Sa1′, Sb1′ and Sc1′. Thus signals Sa1′, Sb1′ and Sc1′ are compared with signals $\overline{Sa2}$, $\overline{Sb2}$ and $\overline{Sc2}$, respectively in the EXCLUSIVE-OR circuits $E_a$, $E_b$ and $E_c$ respectively. The detection of whether both signals are coincident is carried out within the interval from the sixth timing mark 7 to the fifteenth, defined by the width of the gating signal ($S_{6-15}$, FIG. 7) appearing at the SET output of FFE. Specifically, the comparison is carried out within the time interval $\Delta t$ of the strobe-pulse $S_{ST}$ occuring immediately before all of flip-flops $FF_1$ through $FF_6$ are reset (FIG. 7 will be referred to). If, though the set of sensors $8a$, $9a$ has scanned a mark in the unit price column $a$, for example, only one signal is thereby read out, that is to say, signal Sa1 is produced but no signal Sa2 due to incompleteness of the marking, as shown in FIG. 3(b), then exclusive OR-gate Ea which has signal inputs responsive to the signals Sa″ and Sa2 will not furnish an output signal since both of the inputs are energized. The resulting "0" signal applied to one input of NAND gate NA will cause this gate to furnish a "1" signal. This 1 signal is applied to one input of an AND gate AN. When the other two inputs of this AND gate, namely the input connected to receive the gating signal at the output of flip-flop $FF_D$ and the further input connected to receive the strobe signal $S_{ST}$ are energized, AND gate AN will furnish a 1 signal at its output (denoted by SS). This signal will set flip-flop FFd. The output signal from this flip-flop when in a set state constitutes a miscount signal which is used to activate an indicator 24. Thus the attendant will be urged to check the card.

If, however, both marking signals are present as the result of the both sensors 8a and 9a having read out the mark depicted in the section 4'', the signals (Sa1', Sb1', Sc1') and the signals ($\overline{Sa2}$, $\overline{Sb2}$, $\overline{Sc2}$) at the inputs of the exclusive OR-gates Ea would be unequal to each other and accordingly the output of the EXCLUSIVE OR circuit $E_a$ will be 1, so that the flip-flop $FF_D$ would not be set. Thus, no miscount signal So would be produced. All inputs to the AND circuit ANa will be 1, so that the output thereof will also be 1, which output signal Sa will be applied to the counter $a'$. Further the output of the sensor 25 for reading out the timing mark will be shaped by the amplifier 13, wave form trimmer circuit 14 into a timing pulse ST, which will be applied to the clock pulse and strobo-pulse generator circuit K as well as to the timing pulse counter TPC, and at the same time, also the shift registers $L_A$, $L_B$, $L_C$ as a shift input Ssf.

The timing pulse counter TPC will count the number of the timing marks 7, the resulting counting signals being applied to decoder $C_{6.15}$ which furnishes and output upon receipt of the sixth and fifteenth timing pulse. The sixth pulse will reset flip-flop $FF_D$ and set flip-flop $FF_E$, and said fifteenth pulse will reset flip-flop $FF_E$.

The output signal from the flip-flop $FF_E$ is applied to AND circuits, ANa, ANb and ANc, from the output of which are taken the final marking signals during the period beginning at the sixth timing pulse and ending at the fifteenth. This timing is due to the fact that the first marking signals have been delayed by five bits by shift registers $L_A$, $L_B$, $L_C$. The final marking signals are to be applied to counters $a'$, $b'$ and $c'$ during the time beginning with the sixth timing pulse and ending with the fifteenth, during which the gates of the AND circuits ANa, ANb and ANc are opened to allow signals to pass therethrough.

It will be understood that final marking signals are supplied by logic circuit 15 for each mark in a column, sequential ones of said final marking signals for any one column causing the corresponding one of counter $a'$, $b'$ or $c'$ to be advanced by one count. Thus, in FIG. 9 may be seen wave forms of mark read out signals Sa for the cards of FIG. 3(a) and FIG. 3(b), in which the mark read out signals Sak are those for all the marks belonging to the column of unit price a in FIG. 3(a), and the signals SaL are those for the marks belonging to the column of unit price a in FIG. 3(b).

Further, the horizontal and vertical printed lines 2 and 3 in the card l are depicted by red ink for the purpose that the luminous diode of the sensor would not be responsive thereto.

If the card l being inserted has come to end, the limit switch 19 will be made to act by the bottom edge 18 of the card, whereby gates of the counters $a'$, $b'$ and $c'$ will be closed, and the counted number will be furnished by said counters $a'$, $b'$ and $c'$ to the subtotal circuit 20, in circuit 20 respective products of the number of marks and unit prices a, b and c, will be computed and transferred to the adding circuit 21 in the order of $a'$, $b'$ and $c'$. The grand total calculated in circuit 21 will then be displayed through the indicator circuit 22.

A printer circuit may be provided if necessary.

Instead of making the marks 5 by means of a black pencil as in the previous examples, marking may also be done by punching or with magnetic ink, which may be read out photo-electrically or magneto-inductively or by any other suitable means. And if one pair of mark sensors 8 and 9 is disposed within the width w corresponding to one section, the shift registers $L_A$, $L_B$, $L_C$ in the circuit shown in FIG. 4 might be omitted thereby simplifying the circuit.

FIG. 8 is an outline in perspective view of an embodiment of the computer according to this invention, wherein is seen an indicator 23 of the total cost of goods then sold as indicated on a card.

The computer according to this invention, which is constituted substantially as outlined as above, and wherein, if a card having marks in predetermined columns indicative of the number of units of goods sold at respective unit prices is simply introduced into the slit of the computer 6, the total sum of prices of goods having been sold will be immediately represented on the indicator of said computer 6, may conveniently be utilized for the counter registers for wide fields including any kind of stores, restaurants, bars, etc. and is seen to be highly reliable for customers with the indication of calculated results produced by the unique process of this invention.

Particularly in the sensor means in mark reading for the respective unit price columns, a plurality of sensors (2 sensors in the illustrated embodiment) is provided spaced apart from each other for reading a single mark, by means of which two points on the same mark are scanned in the direction of the card advancing in the computer. Only in response to signals from both sensors, is a final marking signal generated, whereby the reliability of reading out marks is substantially increased as compared to the device as shown in FIG. 2, wherein only a single sensor is provided for each column, and further if the mark be inadequate or be ambiguous, a miscount signal will be issued instead of a final marking signal, so that any misoperation or miscount may surely be prevented.

What is claimed is:

1. In a computing system adapted to process cards having at least one mark indicative of the number of items sold at a given unit price, and having a first sensing element for sensing a portion of said mark and furnishing a first marking signal in response thereto, and having computing circuit means for computing the total price as a function of said first marking signal and said given unit price, the improvement, comprising, in combination, a second sensing element sensing a second part of said mark and furnishing a second marking signal in response thereto; logic circuit means interconnected between said first and second sensing element and said computing circuit means for furnishing a final marking signal to said computing circuit means only in response to both said first and second marking signals, whereby said computing circuit means computes said total price signal only as a function of a marking signal confirmed by at least a first and second sensing element.

2. A computing system as set forth in claim 1, wherein said logic circuit means comprise first logic circuit means for furnishing said final marking signal; further comprising a second logic circuit means for furnishing a miscount signal in the absence of one and the presence of the other of said first and second marking signals, and indicator means connected to said second logic means for furnishing an indication of said miscount signal.

3. A computing system as set forth in claim 1, wherein each of said cards has a plurality of columns each associated with a corresponding unit price, each column being adapted to receive at least one mark indicative of the number of units sold at said corresponding unit price; wherein said computing system comprises a plurality of sensing element pairs corresponding in number to said plurality of columns, each pair including a first and second sensing element, each pair for sensing marks in a corresponding one of said columns; further comprising transport means for transporting said cards in the direction of said columns past said sensing element pairs.

4. A computing system as set forth in claim 3, wherein said first and second sensing elements in each of said pairs are spaced from each other by a predetermined distance in a direction perpendicular to the direction of transport of said cards; and wherein said second sensing element senses a second part of said mark different from said first part.

5. A computing system as set forth in claim 4, wherein said first sensing element is positioned a predetermined distance ahead of said second sensing element in the direction of transport of said cards, whereby a predetermined time interval elapses between the furnishing of a first marking signal and the corresponding one of said second marking signals; further comprising delay circuit means for delaying said first marking signal for said predetermined time interval thereby creating a delayed first marking signal, and means for applying said delayed first marking signal to said logic circuit means.

6. A computing system as set forth in claim 5, wherein each of said columns has a plurality of spaces for receiving marks each indicative of a single unit sold at the corresponding unit price; wherein each of said cards further has a plurality of timing marks each arranged in a predetermined position relative to one of said spaces; further comprising timing mark sensing means for sensing said timing marks and furnishing corresponding timing signals; and wherein said delay circuit means comprise a plurality of shift register means each having a signal input connected to receive a corresponding one of said first marking signals, a clock input for receiving said timing signals and a shift register output for furnishing said delayed first marking signal to said logic circuit means.

7. A computing system as set forth in claim 6, further comprising counter means connected to said timing signal sensing means for counting said timing signals and furnishing a corresponding counting output signal; gating signal furnishing means connected to said counter means for furnishing a gating signal only in response to counting output signals signifying time instants following the first of said counting signals by time intervals exceeding said predetermined time interval; and wherein said logic circuit means comprise a plurality of AND gates corresponding in number to said plurality of columns, each for furnishing a final marking signal to said computing circuit means only in the simultaneous presence of said delayed first marking signal, the corresponding one of said second marking signals and said gating signal.

8. A computing system as set forth in claim 7, further comprising a plurality of OR gate means corresponding in number to said plurality of AND gates, each having a first input connected to receive one of said delayed first marking signals and a second input connected to receive the corresponding one of said second marking signals, each for furnishing an OR gate signal only in the presence of a signal at one of the said inputs and the absence of a signal at the other, NAND gate means having a plurality of inputs, one connected to each of said OR gate means, for furnishing an error signal in response to the absence of any one of said OR gate output signals, and AND gate means connected to said counter means and said NAND gate means, for furnishing a miscount signal only in the simultaneous presence of said error signal and said gating signal, and indicator means for furnishing a visual indication of said miscount signal.

* * * * *

UNITED STATES PATENT OFFICE
CERTIFICATE OF CORRECTION

PATENT NO. : 3,986,001
DATED : Oct. 12, 1976
INVENTOR(S) : Yutaka Saito

It is certified that error appears in the above-identified patent and that said Letters Patent are hereby corrected as shown below:

On the title page, between items [63] and [52], insert:--

[30] Foreign Application Priority Data
June 6, 1975   Japan ........................ 75-68830

Signed and Sealed this

First Day of March 1977

[SEAL]

Attest:

RUTH C. MASON
*Attesting Officer*

C. MARSHALL DANN
*Commissioner of Patents and Trademarks*